US008555393B2

(12) United States Patent
Davis et al.

(10) Patent No.: US 8,555,393 B2
(45) Date of Patent: Oct. 8, 2013

(54) AUTOMATED TESTING FOR SECURITY VULNERABILITIES OF DEVICES

(75) Inventors: Adam M. Davis, Berryville, VA (US); Attique Ahmad, Reston, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 597 days.

(21) Appl. No.: 12/630,114

(22) Filed: Dec. 3, 2009

(65) Prior Publication Data

US 2011/0138470 A1    Jun. 9, 2011

(51) Int. Cl.
   *H04L 29/06*   (2006.01)
(52) U.S. Cl.
   USPC .................. 726/25; 726/4; 726/24; 370/254
(58) Field of Classification Search
   USPC ....................................................... 726/24, 25
   See application file for complete search history.

(56) References Cited

U.S. PATENT DOCUMENTS

| | | | |
|---|---|---|---|
| 7,013,395 B1 * | 3/2006 | Swiler et al. ..................... | 726/25 |
| 2005/0022018 A1 * | 1/2005 | Szor ............................. | 713/201 |
| 2007/0180529 A1 * | 8/2007 | Costea et al. ................... | 726/24 |
| 2007/0240222 A1 * | 10/2007 | Tuvell et al. .................... | 726/24 |
| 2010/0011029 A1 * | 1/2010 | Niemela ........................ | 707/200 |
| 2010/0083381 A1 * | 4/2010 | Khosravi et al. ................ | 726/24 |
| 2010/0290366 A1 * | 11/2010 | Garcia ........................... | 370/254 |

OTHER PUBLICATIONS

Rosado, "Security services architecture for secure mobile grid systems", 2010, Journal of Systems Architecture, p. 240-258.*

* cited by examiner

*Primary Examiner* — Taghi Arani
*Assistant Examiner* — Gregory Lane

(57) ABSTRACT

A method includes selecting an attack signature from an attack signature database; generating a fingerprint that includes parameters indicative of the attack signature; generating configuration data for one or more test devices based on the fingerprint, wherein the configuration data is capable of configuring the one or more test devices to provide a security response to the attack signature; providing the configuration data to the one or more test devices; transmitting the attack signature to the one or more test devices; examining a security response to the attack signature from the one or more test devices; and outputting a result of the examining.

20 Claims, 12 Drawing Sheets

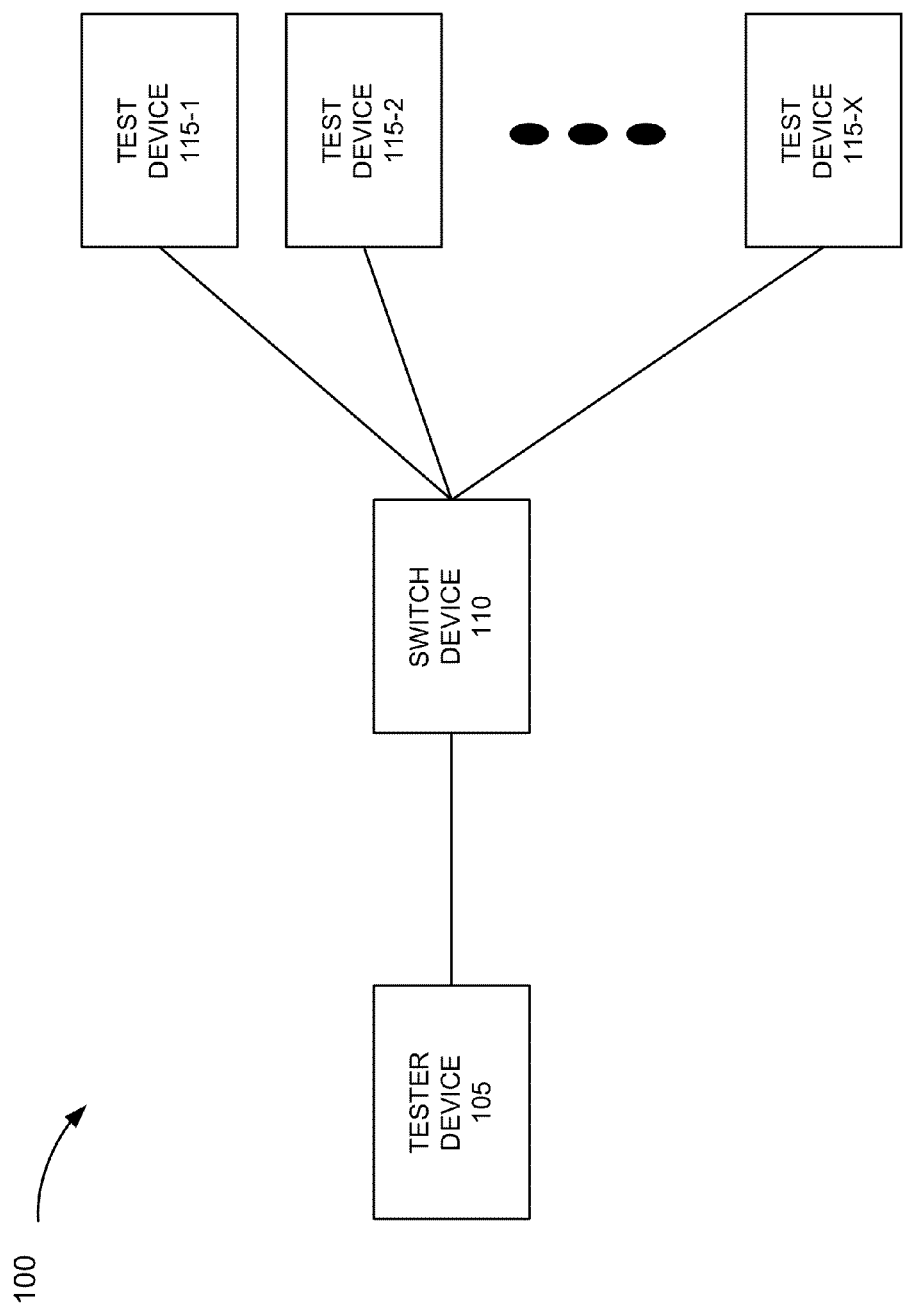

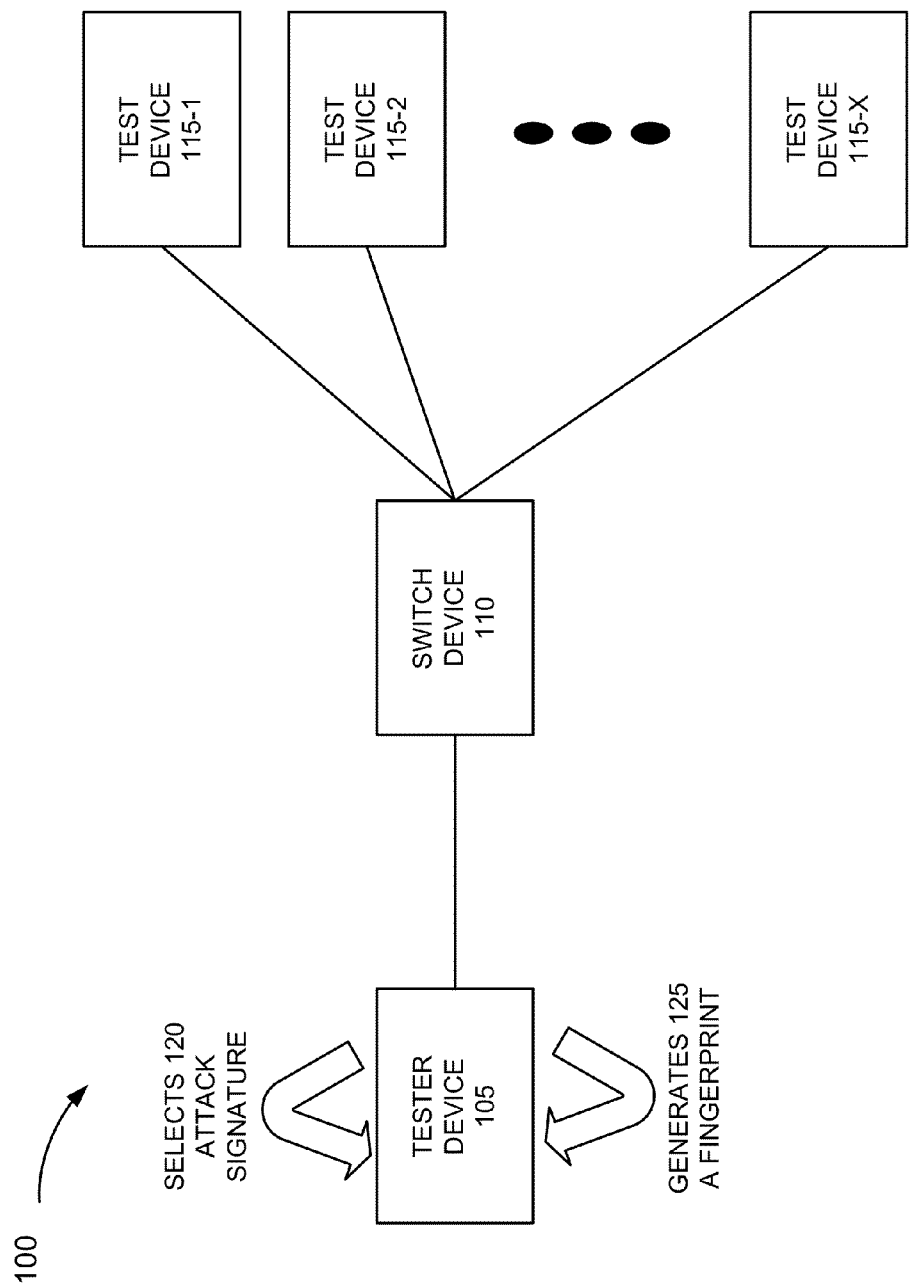

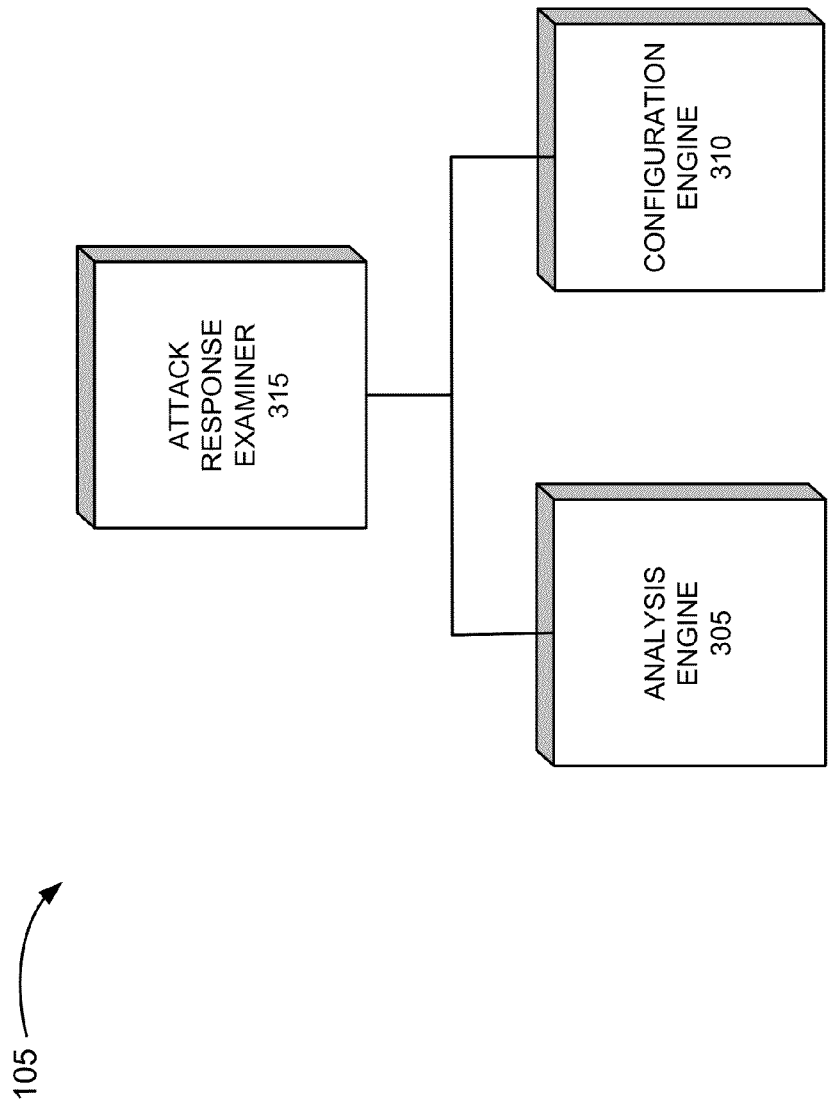

AUTOMATED TESTING FOR SECURITY VULNERABILITIES OF DEVICES

BACKGROUND

Network security devices may be key components in a network. One objective of network security devices is to detect, identify, analyze, cease, and/or mitigate threats, attacks, malicious traffic, etc. One approach utilized by network security devices for performing theses and/or other functions includes defining a series of characteristics that, when matched by network traffic, may allow network security devices to provide an appropriate security response.

BRIEF DESCRIPTION OF THE DRAWINGS

FIG. 1A is a diagram illustrating an exemplary environment in which automated testing for security vulnerabilities of devices may be implemented;

FIGS. 1B-1E are diagrams illustrating an exemplary implementation of automated testing for security vulnerabilities of devices in the exemplary environment;

FIG. 3 is a diagram illustrating exemplary functional components of the tester device;

DETAILED DESCRIPTION OF PREFERRED EMBODIMENTS

Figure 1C:
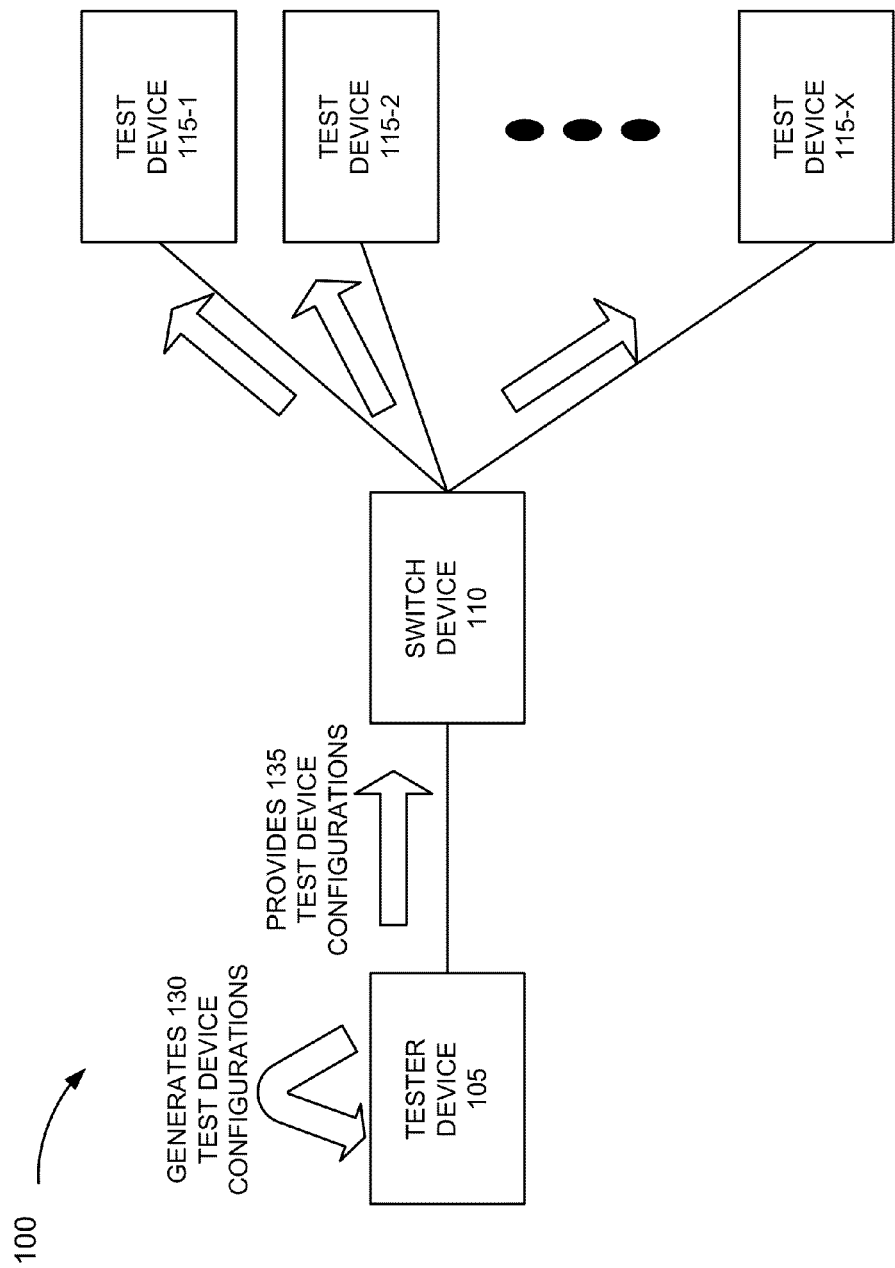

The following detailed description refers to the accompanying drawings. The same reference numbers in different drawings may identify the same or similar elements. Also, the following detailed description does not limit the invention.

The term "attack," as used herein, is to be broadly interpreted to include an attack, a threat, malicious content, and/or some other type of harmful, unauthorized, and/or intrusive content, behavior, etc.

As will be described herein, exemplary embodiments described herein may automate testing for security vulnerabilities of devices. In an exemplary implementation, a tester device may select an attack signature to test against a test device. The tester device may interpret the attack signature and may generate a fingerprint that expresses the parameters of the attack. The tester device may generate configuration data to configure the test device. The configuration data may permit the test device to provide an appropriate security response to the attack. The tester device may provide the configuration data to the test device. The tester device may provide the attack signature to the test device and examine a response of the test device to the attack. The tester device may determine whether the test device provides an appropriate security response (i.e., a correct or an accurate security response).

FIG. 1A is a diagram illustrating an exemplary environment 100 in which automated testing for security vulnerabilities of devices may be implemented. As illustrated in FIG. 1A, exemplary environment 100 may include a tester device 105, a switch device 110, and test devices 115-1 through test device 115-X (X>1) (referred to generally as test devices 115 or test device 115).

The number of devices and configuration in environment 100 is exemplary and provided for simplicity. In practice, environment 100 may include more, fewer, different, and/or differently arranged devices than those illustrated in FIG. 1A. While tester device 105 is illustrated as a single device, in other embodiments, tester device 105 may be implemented as multiple devices. Also, some functions described as being performed by a particular device may be performed by a different device or a combination of devices.

Environment 100 may include wired and/or wireless connections among the devices illustrated. In an exemplary embodiment, environment 100 may be implemented in a lab environment or other controlled environment. For example, tester device 105 may be used to test the security vulnerabilities of various devices (i.e., test devices 115) before deployment. In other embodiments, environment 100 may correspond to a network environment in which tester device 105 may be used to test the security vulnerabilities of one or more test devices 115 after deployment.

Tester device 105 may include one or more devices having the capability to communicate with other devices, systems, networks, and/or the like. For example, tester device 105 may include one or more computers, one or more data centers, one or more servers, and/or some other type of network device.

Switch device 110 may include a device having the capability to communicate with other devices, systems, networks, and/or the like. For example, switch device 110 may include a switch, a router, a bridge, or some other network device that may receive and transmit packets.

Test device 115 may include a security device. For example, test device 115 may include a firewall, an intrusion detection and prevention (IDP) device, an intrusion detection system (IDS), an enforcement point, a network access control device, and/or some other type of security device (e.g., a server, etc.). Test device 115 may provide various types of security services, such as, for example, flow sampling and monitoring, web filtering, virus scanning, deep packet inspection (DPI), mitigation services (e.g., virus scanning, etc.), detection services (e.g., email filtering, etc.), analyzing services, distributed denial of service (DDOS) protection, etc. Test devices 115 may vary between vendor, model, etc.

FIGS. 1B-1E are diagrams illustrating an exemplary implementation of automated testing for security vulnerabilities of devices in the exemplary environment depicted in FIG. 1A. Referring to FIG. 1B, tester device 105 may select 120 an attack signature and generate 125 a fingerprint based on the attack signature. The fingerprint may include an expression that includes various parameters corresponding to the attack signature.

Referring to FIG. 1C, tester device 105 may generate 130 test device configuration data for test devices 115. The configuration data may permit test devices 115 to provide an appropriate security response to the attack. Tester device 105 may generate 130 test device configuration data based on characteristics of test device 115 (e.g., vendor, model number, type of device, type of security service, and/or the like). As illustrated in FIG. 1C, tester device 105 may provide 135 test device configuration data to test devices 115 via switch device 110.

Figure 1D:
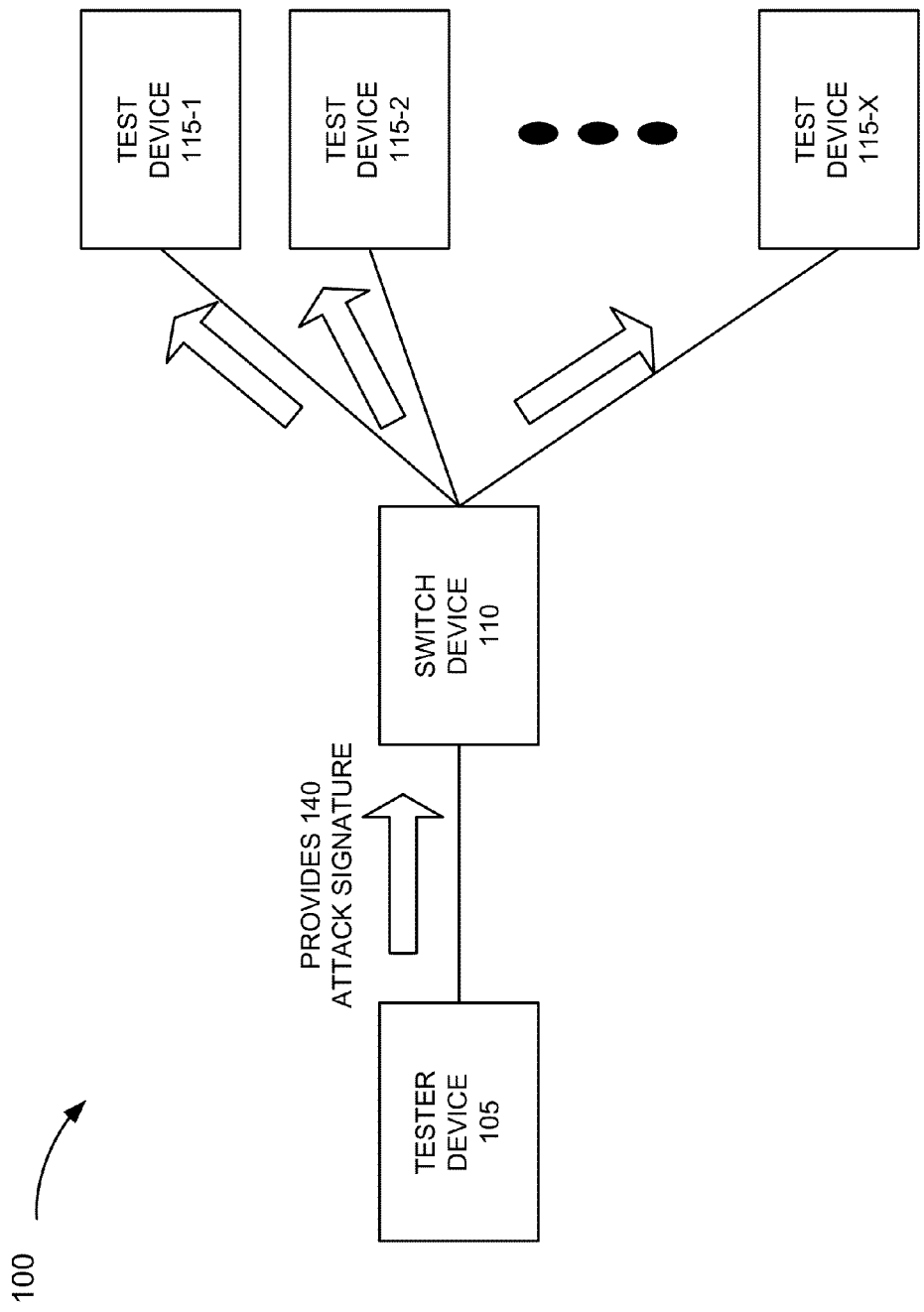
Figure 1E:
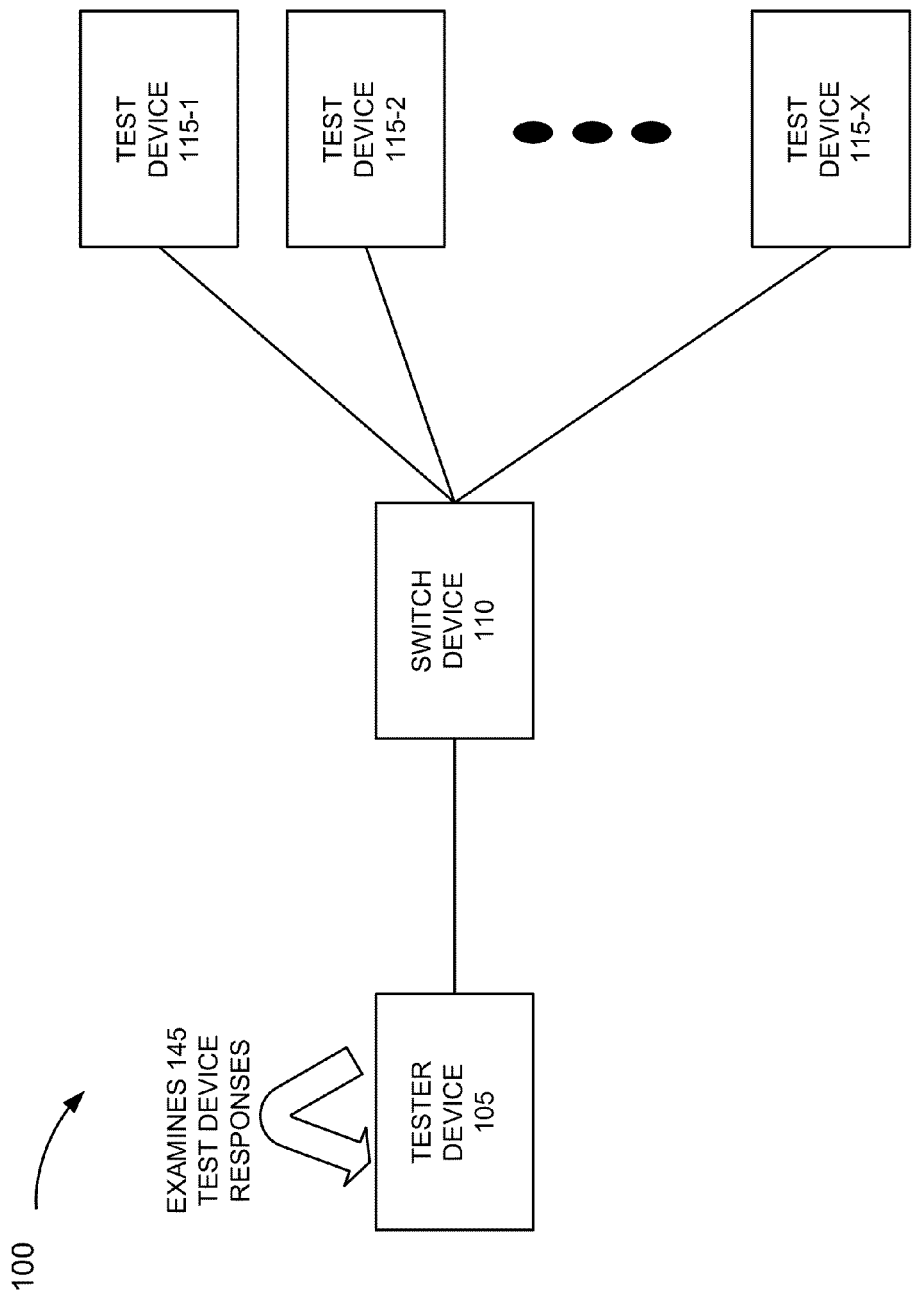

Referring to FIG. 1D, tester device 105 may provide 140 an attack corresponding to the attack signature to test devices 115. As illustrated in FIG. 1E, tester device 105 may examine 145 responses from test devices 115. Tester device 105 may determine whether the responses correspond to appropriate security responses (i.e., test devices 115 provide appropriate security services) or inappropriate security responses (i.e., test devices 115 provide inappropriate security services).

As a result of the foregoing, testing of security devices may be automated. This in contrast to existing approaches in which fingerprints may be manually created and manually configured on devices. Additionally, or alternatively, multiple devices, which may differ in model, vendor, etc., may be tested in an automated manner. Since one of the exemplary embodiments has been broadly described, a more detailed description is provided below.

Figure 2:
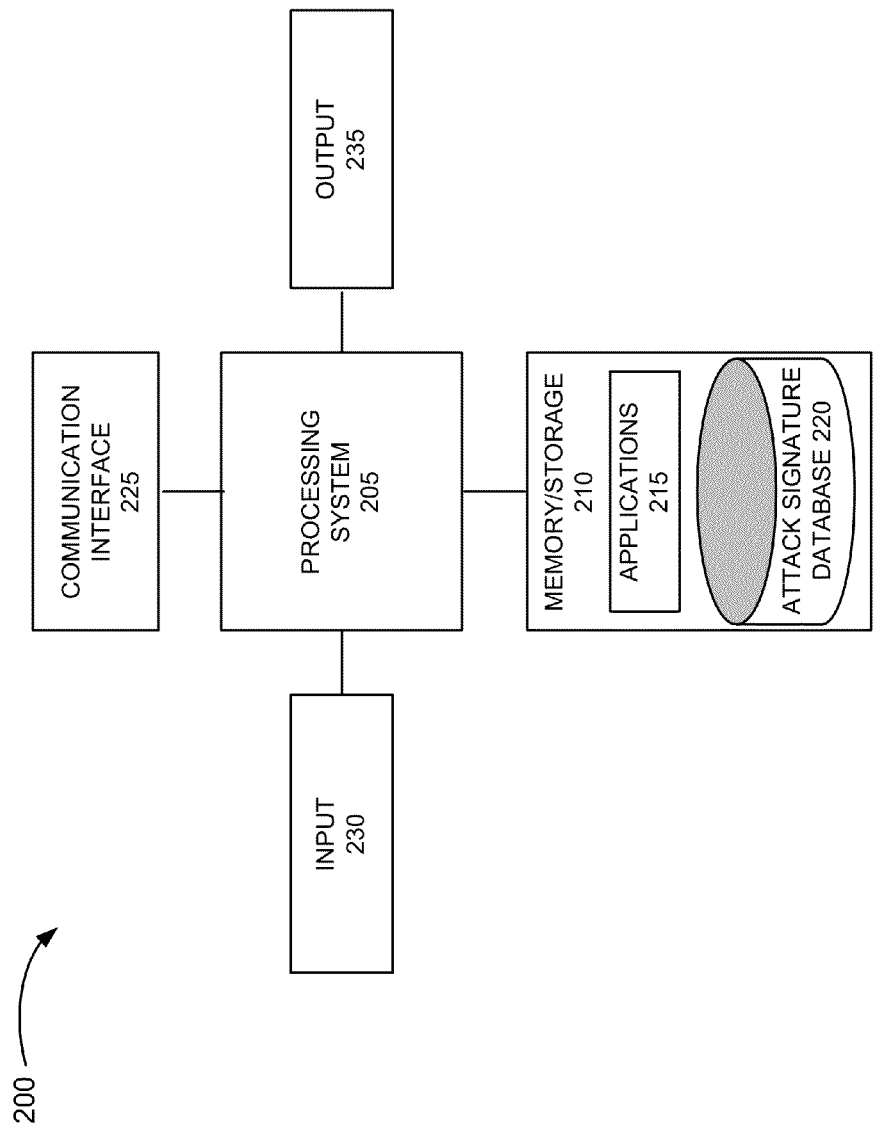
FIG. 2 is a diagram illustrating exemplary components of a tester device.

FIG. 2 is a diagram illustrating exemplary components of device 200 that may correspond to one or more of the devices in environment 100. For example, device 200 may correspond to tester device 105 and/or test device 115. As illustrated, device 200 may include a processing system 205, memory/storage 210 including applications 215 and attack signature database 220, a communication interface 225, an input 230, and an output 235. In other implementations, device 200 may include fewer components, additional components, different components, and/or a different arrangement of components than those illustrated in FIG. 2 and described herein.

Processing system 205 may include one or more processors, microprocessors, data processors, co-processors, application specific integrated circuits (ASICs), controllers, programmable logic devices, chipsets, field programmable gate arrays (FPGAs), or some other component that may interpret and/or execute instructions and/or data. Processing system 205 may control the overall operation, or a portion thereof, of device 200, based on, for example, an operating system and/or various applications (e.g., applications 215).

Memory/storage 210 may include one or more memories and/or one or more secondary storages. For example, memory/storage 210 may include a random access memory (RAM), a dynamic random access memory (DRAM), a read only memory (ROM), a programmable read only memory (PROM), a flash memory, and/or some other type of memory. Memory/storage 210 may include a hard disk (e.g., a magnetic disk, an optical disk, a magneto-optic disk, a solid state disk, etc.) or some other type of computer-readable medium, along with a corresponding drive. Memory/storage 210 may include a memory, a storage device, or storage component that is external to and/or removable from device 200, such as, for example, a Universal Serial Bus (USB) memory stick, a hard disk, mass storage, off-line storage, etc.

The term "computer-readable medium," as used herein, is intended to be broadly interpreted to correspond to, for example, a memory, a storage device (e.g., a hard disk and corresponding drive), a compact disc (CD), a digital versatile disc (DVD), or the like. The computer-readable medium may be implemented in a single device, in multiple devices, in a centralized manner, or in a distributed manner. Memory/storage 210 may store data, application(s), and/or instructions related to the operation of device 200.

Applications 215 may include software that provides various services or functions. For example, with reference to tester device 105, applications 215 may include one or more applications for automating testing for security vulnerabilities of devices. Additionally, or alternatively, with reference to test device 115, applications 215 may include one or more applications for providing security services.

Attack signature database 220 may include a repository of expressions (often referred to as attack signatures) that may be used to identify various types of attacks. An attack signature may include one or more components to uniquely describe an attack. Since there are various types of attacks, attack signature database 220 may include various types of attack signatures. For example, an attack signature may define the characteristics of an option field within a packet, while another attack signature may define characteristics of a payload, etc. The attack signatures may correspond to complex attacks, simple attacks, a distributed denial of service attack, a flooding attack, a virus attack, etc.

Communication interface 225 may permit device 200 to communicate with other devices, networks, systems and/or the like. For example, communication interface 225 may include a cable interface, a fiber optic interface, a radio interface, and/or some other type of wireless interface and/or wired interface.

Input 230 may permit a user and/or another component or device to input information into device 200. For example, input 230 may include a keyboard, a keypad, a display, a touchpad, a mouse, a button, a switch, a microphone, an input port, a drive, voice recognition logic, and/or some other type of visual, auditory, and/or tactile input component. Output 235 may permit device 200 to output information from device 200 (e.g., to a user and/or to another component or device). For example, output 235 may include a display, a speaker, light emitting diodes (LEDs), an output port, and/or some other type of visual, auditory, and/or tactile output component.

As described herein, device 200 may perform operations in response to processing system 205 executing software instructions contained in a computer-readable medium, such as memory/storage 210. The software instructions may be read into memory/storage 210 from another computer-readable medium or from another device via communication interface 225. The software instructions contained in memory/storage 210 may cause processing system 205 to perform processes described herein. Alternatively, hardwired circuitry may be used in place of or in combination with software instructions to implement processes described herein. Thus, implementations described herein are not limited to any specific combination of hardware circuitry and software.

FIG. 3 is a diagram illustrating exemplary functional components associated with tester device 105. As illustrated, tester device 105 may include an analysis engine 305, a configuration engine 310, and an attack response examiner 315. Analysis engine 305, configuration engine 310, and/or attack response examiner 315 may be implemented as a combination of hardware (e.g., processing system 205, etc.) and software (e.g., applications 215, etc.) based on the components illustrated and described with respect to FIG. 2. Alternatively, analysis engine 305, configuration engine 310, and/or attack response examiner 315 may be implemented as hardware based on the components illustrated and described with respect to FIG. 2. It may be assumed that tester device 105 includes and/or has access to attack signature database 220.

Analysis engine 305 may select an attack signature from attack signature database 220. In an exemplary implementation, analysis engine 305 may interpret the attack signature and automatically generate a platform independent fingerprint (e.g., an expression that is independent of a specific technological platform (e.g., hardware, software, etc.) to which it may be implemented) that includes parameters associated with an attack. As described herein, since the fingerprint may be platform independent, configuration engine 310 may generate configuration data for various types of test devices 115 (e.g., in terms of model, vendor, etc.).

The parameters associated with the fingerprint may include, for example, but are not limited to, source network address and destination network address, source port number and destination port number, protocol, flag(s) in header, and/or packet rate.

By way of example, assume analysis engine 305 selects a Transmission Control Protocol (TCP) flood attack. Analysis engine 305 may extract the following parameters based on its analysis of the attack signature: source IP: 192.168.1.2; destination IP: 10.2.1.1; TCP flag: SYN; and rate (packets per second): 2000. In another example, assume analysis engine 305 selects a more complex attack signature where the Uniform Resource Identifier (URI) in a Hypertext Transfer Protocol (HTTP) packet includes a request to modify password information. Analysis engine 305 may extract the following parameters based on its analysis of the attack signature: source IP: 192.168.1.2; destination IP: 10.2.1.1; source port: any; destination port: 80; TCP flag: PSH, ACK; URI: "(pswd|change)."

Analysis engine 305 may provide the fingerprint to configuration engine 310.

Configuration engine 310 may automatically generate configuration data for test device 115 based on a fingerprint. Configuration engine 310 may utilize characteristics of test device 115 (e.g., vendor, model number, type of device, type of security service, and/or the like) to automatically generate the appropriate configuration data. In an exemplary implementation, configuration engine 310 may consult a database (not illustrated) to identify system parameters (e.g., operating system, software specifications, hardware specifications, etc.) associated with the particular test device 115.

By way of example, assume configuration engine 310 receives the TCP flood fingerprint. Configuration engine 310 may generate the following configuration for Vendor A, a manufacturer of an IDS:

```
detect_record name "tcp flood"
inputs ( )           (
                     Enable src ip 192.168.1.2
                     Enable dst ip 10.2.1.1
                     Enable tcp fl syn
                     Enable pps rate 200
                     )
detect_record apply "tcp flood"
```

In another example, assume configuration engine 310 receives and parses the fingerprint for the complex attack and generates the following configuration for Vendor B, a manufacturer of deep packet inspection hardware and software:

```
dpi map name "http attack"
dpi map start
dpi map inspect sip 192.168.1.2
dpi map inspect dip 10.2.1.1
dpi map inspect sp 0
dpi map inspect dp 80
dpi map inspect to ack+psh
dpi map inspect uri description "pswd|change"
dpi map end

dpi map apply customer 42.
```

The configuration data may permit test device 115 to provide various security services, such as, for example, flow sampling and monitoring, web filtering, email filtering, virus scanning, deep packet inspection (DPI), mitigation services, detection services, analyzing services, DDOS prevention and/or mitigation, etc. Configuration engine 310 may provide the configuration data to test device 115. For example, configuration engine 310 may utilize Simple Network Management Protocol (SNMP) or a command line interface (CLI) to provide the configuration data to test device 115. Test device 115 may load the configuration data.

Attack response examiner 315 may provide an attack to test device 115 and examine a response from test device 115 after the attack. Attack response examiner 315 may determine whether the response corresponds to an appropriate security response (i.e., test device 115 provides an appropriate security service) or an inappropriate security response (i.e., test device 115 provides an inappropriate security service). For example, an appropriate security response may include test device 115 generating an alert in view of the attack. In an exemplary implementation, attack response examiner 315 may poll test device 115 and determine whether the alert has been generated. However, there may be an instance when test device 115 fails to generate the alert (e.g., due to the configuration data, inability of test device 115 to handle or identify the attack, etc.). In such an instance, attack response examiner 315 may determine that test device 115 provides an inappropriate security response due to a failure to generate the alert.

Although FIG. 3 illustrates exemplary functional components of tester device 105, in other implementations, tester device 105 may include fewer functional components, additional functional components, different functional components, and/or a different arrangement of functional components than those illustrated in FIG. 3 and described. Additionally, or alternatively, one or more operations described as being performed by a particular functional component may be performed by one or more other functional components, in addition to or instead of the particular functional component. Additionally, or alternatively, as previously described, although tester device 105 is illustrated as a single device, tester device 105 may be implemented as multiple devices in which one or more of the functional components described may be implemented in a distributed fashion. In addition, attack signature database 220 may be implemented in a distributed fashion.

Figure 4A:
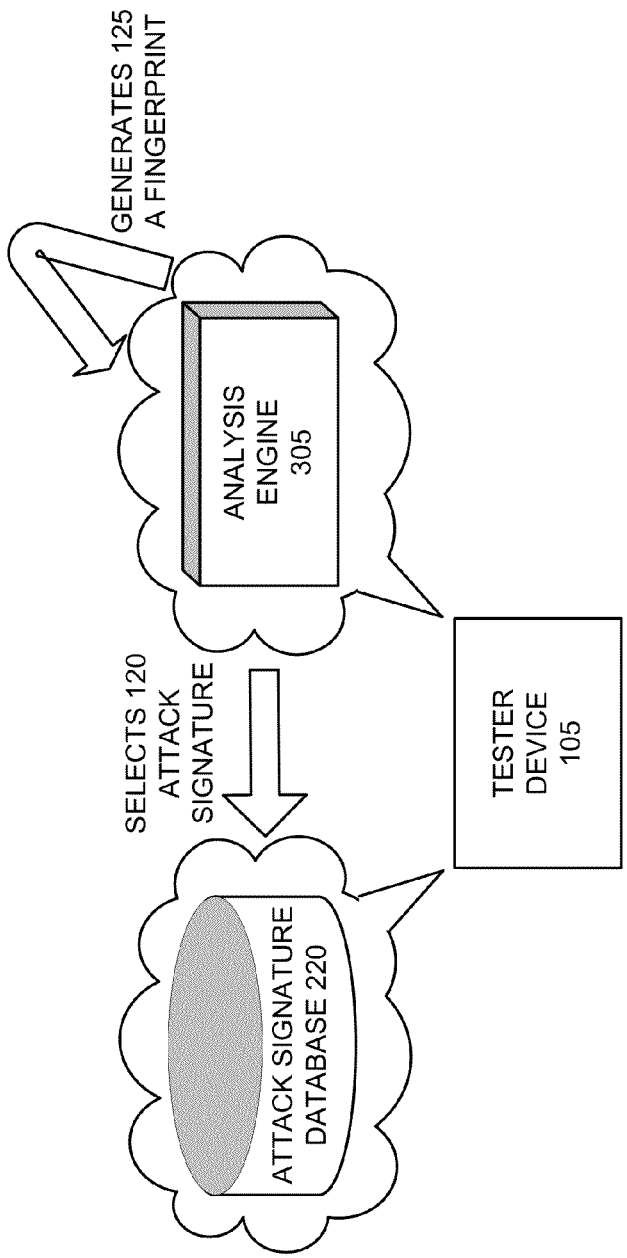
FIGS. 4A-4D are diagrams illustrating exemplary operations performed by the tester device.
Figure 4B:
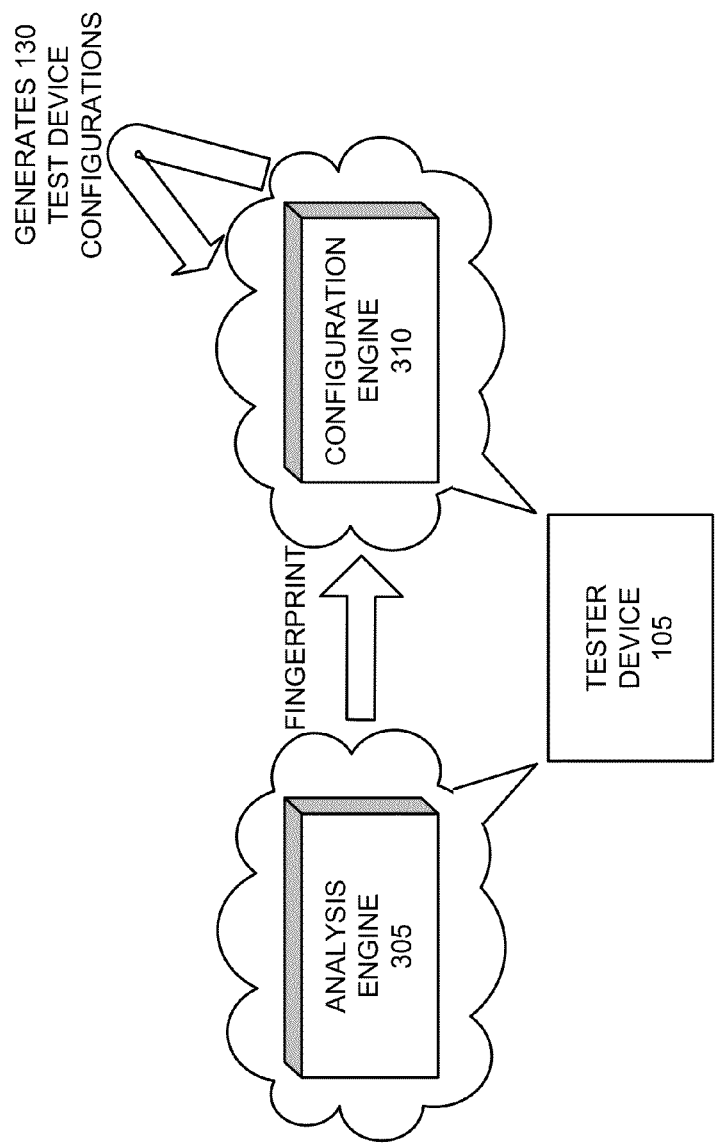

FIGS. 4A-4D are diagrams illustrating an exemplary implementation of automated testing for security vulnerabilities of devices. As illustrated in FIG. 4A, analysis engine 305 of tester device 105 may select 120 an attack signature from attack signature database 220. Analysis engine 305 may generate 125 a fingerprint based on the selected attack signature. Once the fingerprint is generated, analysis engine 305 may provide the fingerprint to configuration engine 310, as illustrated in FIG. 4B. As further illustrated, configuration engine 310 may generate 130 configuration data for test device 115 based on the fingerprint.

Figure 4C:
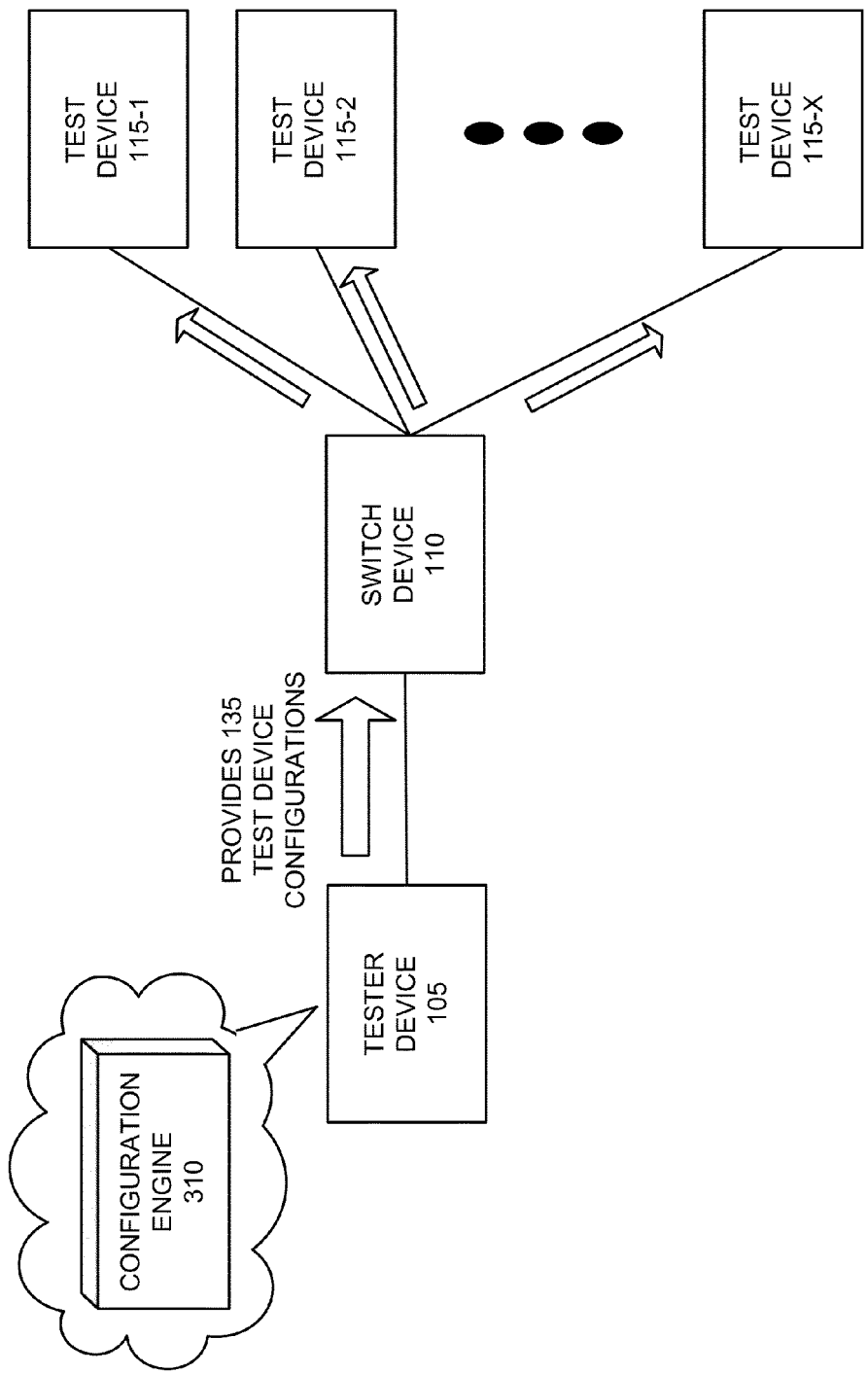

Referring to FIG. 4C, configuration engine 310 may provide 135 the configuration data to test device 115. Test device 115 may load the configuration data.

Figure 4D:
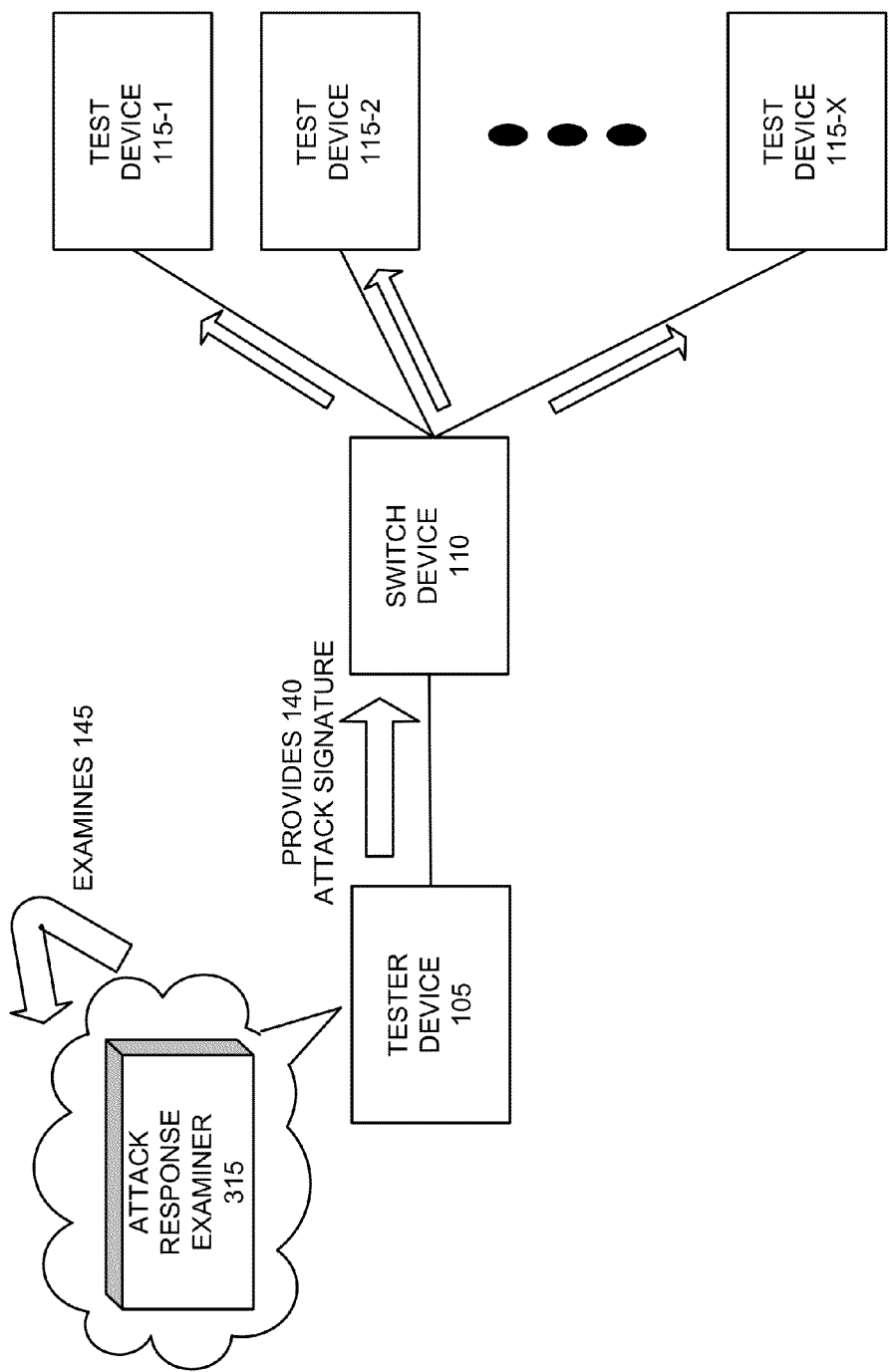

As illustrated in FIG. 4D, attack response examiner 315 may provide 140 the attack signature to test device 115. Thereafter, attack response examiner 315 may examine 145 a response from test device 115 to determine whether test device 115 responded correctly or not.

Figure 5:
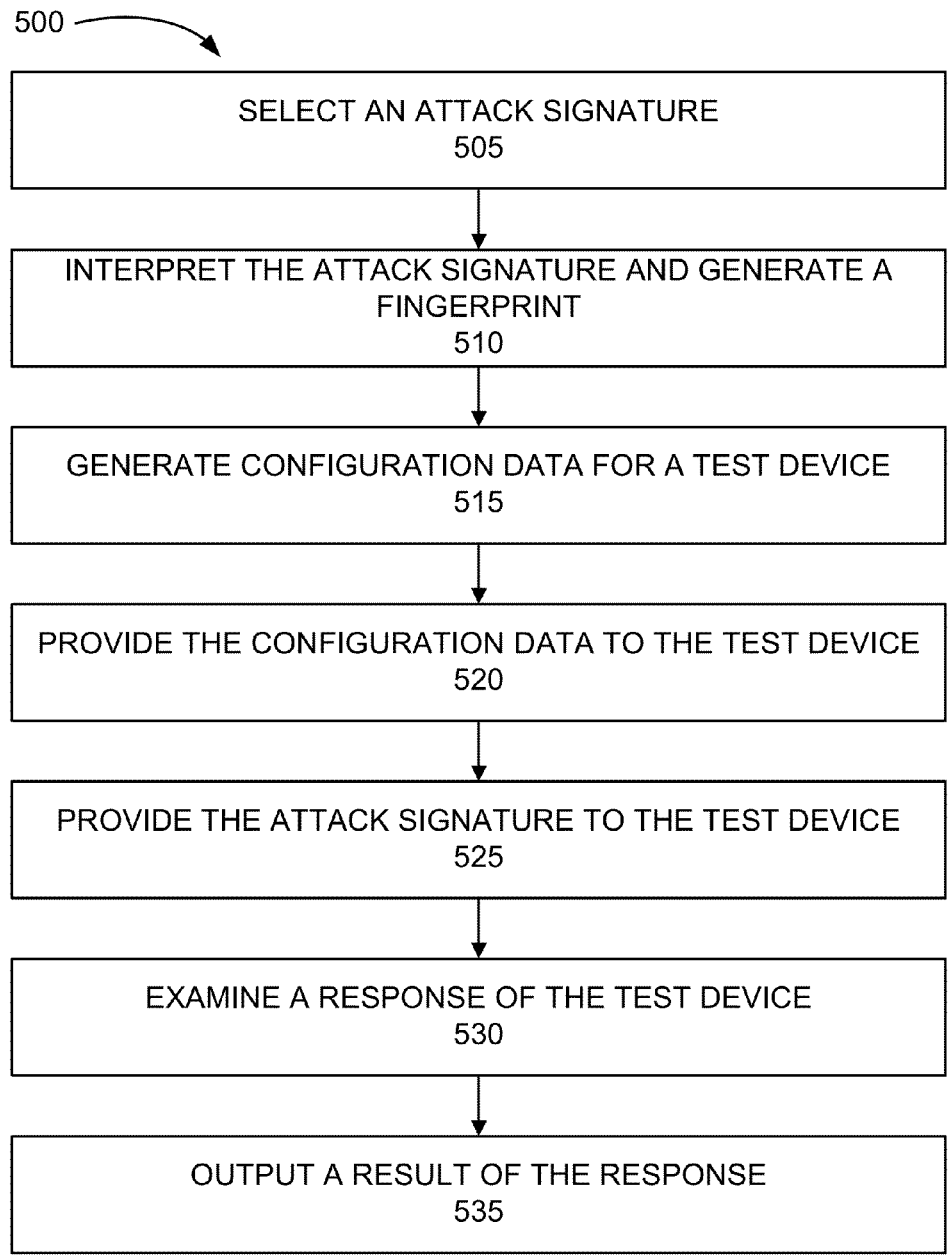
FIG. 5 is a flow diagram illustrating an exemplary process to provide automated testing for security vulnerabilities of devices.

FIG. 5 illustrates a flow diagram of an exemplary process 500 for automating testing for security vulnerabilities of devices. In an exemplary implementation, process 500 may be performed by tester device 105. Tester devices 105 may be implemented as one or multiple devices. Additionally, or alternatively, one or multiple test devices 115 may be tested.

Process 500 may include selecting an attack signature (block 505). For example, analysis engine 305 may select an attack signature from attack signature database 220.

The attack signature may be interpreted and a fingerprint may be generated (block 510). For example, analysis engine 305 may interpret the attack signature and automatically generate a platform independent fingerprint (e.g., an expression) that includes parameters associated with an attack. Since the fingerprint may be platform independent, configuration engine 310 may generate configuration data for various types of test devices 115 (e.g., in terms of model, vendor, etc.). The parameters associated with the fingerprint may include, for example, but are not limited to, source network address and destination network address, source port number and destination port number, protocol, flag(s) in header, and/or packet rate. Analysis engine 305 may provide the fingerprint to configuration engine 310.

Configuration data for test device 115 may be generated (block 515). For example, configuration engine 310 may automatically generate configuration data for test device 115 based on a fingerprint. Configuration engine 310 may utilize characteristics of test device 115 (e.g., vendor, model number, type of device, type of security service, and/or the like) to automatically generate the appropriate configuration data. In an exemplary implementation, configuration engine 310 may consult a database (not illustrated) to identify system parameters associated with the particular test device 115. The configuration data may permit test device 115 to provide various security services, such as, for example, flow sampling and monitoring, web filtering, email filtering, virus scanning, deep packet inspection (DPI), mitigation services, detection services, analyzing services, DDOS prevention and/or mitigation, etc.

The configuration data may be provided to test device 115 (block 520). For example, configuration engine 310 may provide the configuration data to test device 115 (e.g., based on the SNMP or CLI) and test device 115 may load the configuration data.

The attack signature may be provided to test device 115 (block 525). For example, attack response examiner 315 may provide an attack (i.e., an attack corresponding to the attack signature selected in block 505) to test device 115.

A response of test device 115 may be examined (block 530). For example, attack response examiner 315 may examine a response from test device 115 after the attack. Attack response examiner 315 may determine whether the response corresponds to an appropriate security response or an inappropriate security response. In an exemplary implementation, attack response examiner 315 may poll test device 115 and determine whether the appropriate security response or an inappropriate response has been generated by test device 115. For example, depending on the attack and the security service provided by test device 115, the appropriate security response may correspond to the detection of the attack, the mitigation of the attack, the cessation of the attack, etc. Conversely, an inappropriate security response may correspond to the failure of test device 115 to detect the attack, mitigate the attack, cease the attack, etc.

A result of the response may be outputted (block 535). For example, tester device 105 may output a result (e.g., a report) based on the examination. The result may indicate whether test device 115 provided the appropriate security response or not.

Although FIG. 5 illustrates the exemplary process 500, in other implementations, additional operations, fewer operations, and/or different operations than those illustrated in FIG. 5 and described, may be performed.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 5, the order of the blocks may be modified in other implementations. Further, non-dependent blocks may be performed in parallel.

It will be apparent that devices, methods, and/or systems, described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" that performs one or more functions. This logic may include hardware, such as one or more processors, one or more microprocessors, one or more ASICs, one or more FPGAs, etc., software, or a combination of hardware and software.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive. No element, act, or instruction used in the present application should be construed as critical or essential to the implementations described herein unless explicitly described as such.

What is claimed is:

1. An automated method comprising:
   selecting an attack signature from an attack signature database;
   generating a fingerprint that includes parameters indicative of the attack signature, wherein the fingerprint is platform independent;
   generating configuration data for one or more test devices based on the fingerprint, wherein the configuration data is used to configure the one or more test devices to provide a security response to the attack signature, and wherein generating the configuration data is based on model and vendor information associated with the one or more test devices;
   providing the configuration data to the one or more test devices;
   transmitting the attack signature to the one or more test devices;
   examining a security response to the attack signature from the one or more test devices; and
   outputting a result of the examining.

2. The method of claim 1,
   further comprising:
   identifying system parameters associated with the one or more test devices, wherein the system parameters pertain to an operating system, a software specification, and a hardware specification.

3. The method of claim 1, wherein the parameters of the fingerprint include a source network address, a destination network address, a source port number, a destination port number, and a packet rate.

4. The method of claim 1, wherein the examining comprises:
polling the one or more test devices for the security response.

5. The method of claim 4, wherein the examining comprises:
determining whether the security response is an appropriate security response to the attack signature.

6. The method of claim 1, further comprising:
storing the attack signature database.

7. The method of claim 1, further comprising:
loading the configuration data on the one or more test devices.

8. The method of claim 1, wherein the generating the configuration data further comprises:
accessing a database to identify system parameters associated with the one or more test devices.

9. A network device comprising:
one or more memories to store instructions; and
one or more processors to execute the instructions in the one or more memories to automatically:
select an attack signature;
generate a fingerprint of the attack signature that includes parameters indicative of the attack signature, wherein the fingerprint is platform independent;
generate configuration data for one or more security devices, wherein the configuration data is used to configure the one or more security devices to provide a response to the attack signature, and wherein the configuration data is generated based on model and vendor information associated with the one or more security devices;
provide the configuration data to the one or more security devices;
transmit the attack signature to the one or more security devices; and
examine a security response to the attack signature from the one or more security devices.

10. The network device of claim 9, wherein the parameters of the fingerprint include a source network address, a destination network address, a source port number, a destination port number, and indicate a protocol.

11. The network device of claim 9, wherein the one or more processors are to execute the instructions to:
interpret the attack signature.

12. The network device of claim 9, wherein the network device comprises a server.

13. The network device of claim 12, wherein the attack signature corresponds to one of a distributed denial of service attack, a flooding attack, or a virus attack.

14. The network device of claim 12, wherein the one or more processors are to execute the instructions to:
access an attack signature database.

15. The network device of claim 12, wherein, when generating the configuration data, the one or more processors are to execute the instructions to:
identify system parameters associated with the one or more security devices.

16. The network device of claim 9, wherein the one or more processors are to execute the instructions to:
determine whether the security response from the one or more security devices is an appropriate security response to the attack signature.

17. One or more non-transitory computer-readable storage media containing instructions executable by at least one processor, the one or more non-transitory computer-readable storage media storing instructions for:
selecting an attack signature;
generating a fingerprint that includes parameters indicative of the attack signature, wherein the fingerprint is platform independent;
generating configuration data for one or more test devices based on the fingerprint, wherein the configuration data is used to configure the one or more test devices to provide a security response to the attack signature, and wherein generating the configuration data is based on model and vendor information associated with the one or more test devices;
transmitting the configuration data to the one or more test devices;
transmitting the attack signature to the one or more test devices;
examining a security response to the attack signature from the one or more test devices; and
outputting a result of the examining.

18. The one or more non-transitory computer-readable storage media of claim 17, further comprising one or more instructions for:
polling the one or more test devices for the security response.

19. The one or more non-transitory computer-readable storage media of claim 17, further comprising one or more instructions for:
determining whether the security response from the one or more test devices is an appropriate security response to the attack signature.

20. The one or more non-transitory computer-readable storage media of claim 17, wherein the generating the configuration data further comprises one or more instructions for:
identifying system parameters associated with the one or more test devices.

* * * * *